Figure 1:
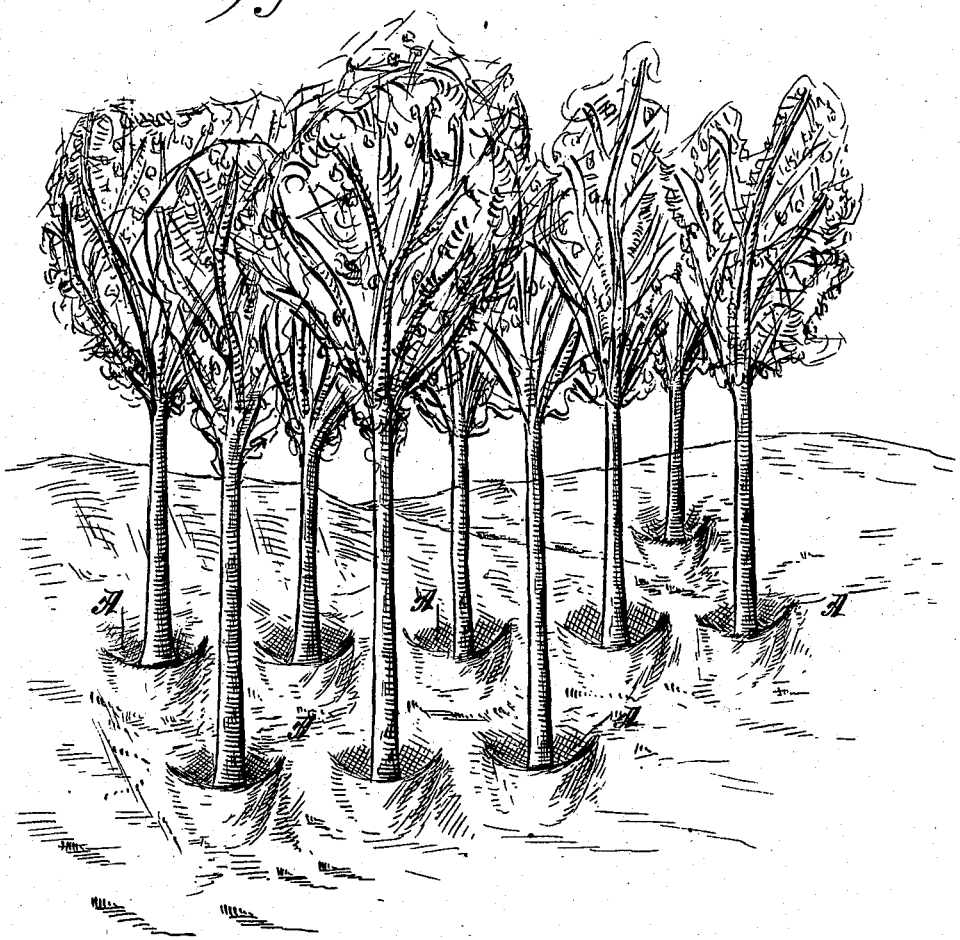

No. 867,157. PATENTED SEPT. 24, 1907.
M. RICHTER.
METHOD OF UTILIZING HILLSIDES AND MOUNTAINS.
APPLICATION FILED JULY 27, 1907.

2 SHEETS—SHEET 1.

WITNESSES
E. M. Callaghan
Edw. W. Byrn

INVENTOR
MAURICE RICHTER
BY Munn & Co.
ATTORNEYS.

No. 867,157. PATENTED SEPT. 24, 1907.
M. RICHTER.
METHOD OF UTILIZING HILLSIDES AND MOUNTAINS.
APPLICATION FILED JULY 27, 1907.
2 SHEETS—SHEET 2.
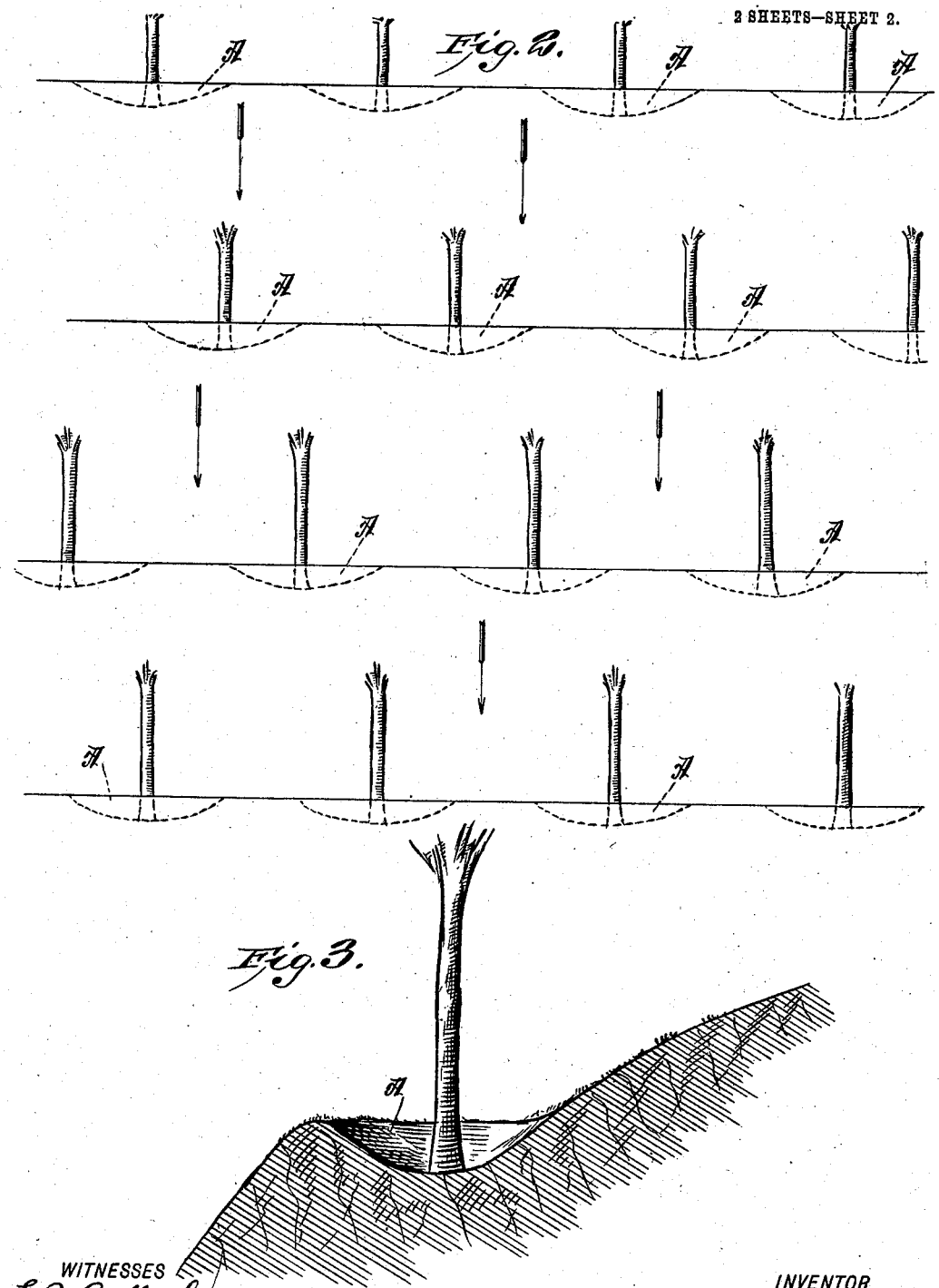

UNITED STATES PATENT OFFICE.

MAURICE RICHTER, OF WILLIAMSTOWN, WEST VIRGINIA.

METHOD OF UTILIZING HILLSIDES AND MOUNTAINS.

No. 867,157.      Specification of Letters Patent.      Patented Sept. 24, 1907.

Application filed July 27, 1907. Serial No. 385,796.

*To all whom it may concern:*

Be it known that I, MAURICE RICHTER, a citizen of the United States, and a resident of Williamstown, in the county of Wood and State of West Virginia, have made certain new and useful Improvements in Methods of Utilizing Hillsides and Mountains, of which the following is a specification.

The rush of water from rains or melting snow running down the mountain-side makes at times dangerous freshets, denuding the soil, fouling and rendering irregular the flowing of streams, leaving the mountain-side for the most part barren by reason of the lack of a sufficient quantity of retained moisture.

My invention is designed to overcome these difficulties and so not only avoid the objectionable contingencies named but at the same time reclaiming and utilizing the land of the mountain-side for useful, economic purposes in a highly profitable way.

My invention consists in forming the hill-side into a succession of series of shallow basins adapted to hold and retain the precipitation of water and planting in each basin a growing tree, the rapidity of whose growth is greatly promoted by the retained volume of water held in the basin, each descending series of trees having its individual basins alternating with the basins of the series above, or being staggered or placed so that the lines of quickest descent do not coincide in the adjacent series.

In the drawing—Figure 1 is a perspective view of a mountain or hill-side altered in form and planted in accordance with my invention. Fig. 2 is a diagrammatic illustration of the alternation of the basins of one horizontal series in relation to the basins of the other adjacent horizontal series, and Fig. 3 is a vertical section through a mountain-side taken through one of the basins.

In the drawing A represents the basins, which are scooped out and the earth banked up on the low side so as to form a shallow retaining reservoir. These basins alternate as shown in Fig. 2, that is to say, the line of quickest descent from any one basin falls outside of the line of quickest descent from the basins in the horizontal series above and below, until a point is reached where the extreme precipitation over a given area will be accommodated and retained by the reservoir capacity of the basins in that area. Theoretically this is designed to retain on the mounatin-side all of the water falling or flowing thereon. The important results attained are that the water is never allowed to mass into volume and hydraulic power and exercises no destructive influence in denuding the soil and vegetation and does not foul nor swell the streams and at the same time the tree, whose life and growth on the hillside is ordinarily stunted from lack of water, is nourished abundantly and its growth and productiveness in timber and fruit greatly increased.

Aside from all requirements of correct and careful tree planting, it is essential while preparing the indentations, basins, or pockets, that the surface soil should be well taken care of and be brought close to and around the roots of the tree, the tree being planted in the center of the basin and at such depth that when the roots are covered and the planting complete, the surface of the ground of the basins should slope toward the tree.

In further noting the advantages of my invention, I would mention:

1. The prevention of damaging cuts and washing away of the best surface soil, and thus preventing the further impoverishing of the hills and mountains.

2. The promotion of speedy growth of timber, so much needed, and also of fruit trees. The retained moisture will nourish the trees and by this method the trees may be grown in half the time it otherwise requires.

3. The prevention of destructive high-waters and floods, which are becoming more frequent and disastrous.

4. More steady flow of navigable rivers.

5. To make the hills and mountains wealth producing areas and provide a better future, for the inhabitants of these regions.

I claim:

1. The method of conserving and utilizing hillsides and mountains, which consists in forming on the slope a succession of reservoir basins, the basins of any one series crossing the line of descent being spaced out of the descending alinement of the basins of the other adjacent series.

2. The method of conserving and utilizing hillsides and mountains, which consists in forming on the slope a succession of reservoir basins, the basins of any one series crossing the line of descent being spaced out of the descending alinement of the basins of the other adjacent series, and planting trees in the said basins to absorb and be nourished by the water accumulating therein.

MAURICE RICHTER.

Witnesses:
  H. D. LOUGH,
  DELLA FOWLER.